US008274673B2

(12) United States Patent
Okumura et al.

(10) Patent No.: US 8,274,673 B2
(45) Date of Patent: Sep. 25, 2012

(54) IMAGE READING APPARATUS, AND IMAGE FORMING APPARATUS

(75) Inventors: Ryuichi Okumura, Osaka (JP); Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 731 days.

(21) Appl. No.: 12/498,655

(22) Filed: Jul. 7, 2009

(65) Prior Publication Data
US 2010/0007906 A1    Jan. 14, 2010

(30) Foreign Application Priority Data

Jul. 8, 2008 (JP) ................................ 2008-177480

(51) Int. Cl.
*G06F 3/12* (2006.01)
*H04N 1/40* (2006.01)
*H04N 1/38* (2006.01)
*G06K 9/40* (2006.01)

(52) U.S. Cl. ....... 358/1.13; 358/488; 358/496; 358/463; 358/448; 358/474; 382/275

(58) Field of Classification Search .................. None
See application file for complete search history.

(56) References Cited

U.S. PATENT DOCUMENTS

| 6,563,938 | B1  |   | 5/2003  | Harada |           |
|-----------|-----|---|---------|--------|-----------|
| 7,751,095 | B2  | * | 7/2010  | Suzuki et al. | 358/474 |
| 7,813,010 | B2  | * | 10/2010 | Michiie et al. | 358/474 |
| 2002/0176634 | A1 | * | 11/2002 | Ohashi | 382/275 |
| 2004/0201869 | A1 | * | 10/2004 | Kosaka | 358/3.26 |

FOREIGN PATENT DOCUMENTS

| JP | 06245036    | 9/1994 |
|----|-------------|--------|
| JP | 2000-196814 | 7/2000 |
| JP | 2008141620  | 6/2008 |

* cited by examiner

*Primary Examiner* — Hilina S Kassa
(74) *Attorney, Agent, or Firm* — Gerald E. Hespos; Michael J. Porco

(57) ABSTRACT

A multi-functional peripheral allows a user to select a productivity priority mode or an image quality priority mode. In the productivity priority mode, a scanner performs a reading operation without moving first and second carriages in a sub-scanning direction, a foreign object image removing processing is executed in accordance with image data obtained by the reading operation, and image forming is performed in accordance with the image data applied with image processing. In the image quality priority mode, the first and second carriages are moved from a reading position P to a reading position P' at which the foreign object does not adhere to a reading slot, the scanner performs the reading operation, and an image forming is performed in accordance with image data applied with image processing not including the foreign object image removing processing.

6 Claims, 11 Drawing Sheets

CONVEYANCE PATH OF DOCUMENT

IMAGE READING APPARATUS, AND IMAGE FORMING APPARATUS

BACKGROUND OF THE INVENTION

1. Field of the Invention

The present invention relates to a so-called sheet-through type image reading apparatus which conveys a document to be read to move on one main side of a transparent plate and reads an image of the document from the other main side of the transparent plate, and an image forming apparatus provided with the image reading apparatus.

2. Description of the Related Art

In a case where a sheet-through type image reading apparatus is used to read an image of a document, print by means of a printer, and take an image into a computer such as a personal computer to display the image on a display, a linear image along a sub-scanning direction may appear in an image. This is usually caused by adherence of foreign objects such as waste, dust, and a paper piece of a conveyed document sheet to a glass of the image reading apparatus, a scratch on the glass, and the like. The linear image may appear as a black line on a white background portion or as a white line on an image portion and is highly visually eye-catching. Therefore, for an image reading apparatus which is required to obtain image data of a document precisely, removal of such linear image is demanded.

As a technology for preventing occurrence of such linear image, there has been proposed a technology disclosed in, for example, the following patent document.

The following Japanese Patent Unexamined Publication No. 2000-196814 discloses as follows. "The sheet-through type document reader in accordance with the present invention has a means for changing a reading position by a predetermined distance only if an abnormal image is detected at a predetermined sheet-through document reading position. Thus, a black linear image due to waste (dust), dirt, or a scratch can be prevented. In other words, if waste (dust) 27 is detected at a predetermined reading position, the reading position is shifted by a predetermined distance D, and the document reading is performed. Until a new abnormal image is detected at the shifted reading position, the sheet-through type document reader continues executing the reading at the same position . . . (abbreviated) . . . . The reading (hereinafter, referred to as "pre-scanning") is performed before the document is conveyed to the reading section. That is, document reading is performed in a state where a document is not present at the reading position, in other words, the document presenting member (white sheet 26) 23 is read directly."

According to the technology of the patent document, a predetermined time period is required for moving the reading position by the predetermined distance D. Here, this time can be provided during a period when a document is not passing through the reading position. In other words, the time period can be provided during a period when a clearance between documents is passing through the reading position.

However, especially in image reading apparatuses available in recent years, the clearance between documents is made as small as possible to improve the number of documents (productivity) which can be read in a unit of time. In such case, it is difficult to secure the time for moving the reading position by the predetermined distance D during the aforementioned period. Therefore, for the purpose of securing the time for moving the reading position by the predetermined distance D, it is necessary to make the clearance between documents be wider or temporarily stop conveying documents each time when the clearance passes through the reading position. However, either of those may lower the productivity.

On the other hand, as a technology for preventing occurrence of a linear image other than the technology of changing the reading position, there has been a known technology of executing an image processing to remove a linear image from an image which is obtained by a reading operation without changing the reading position. If this technology is adopted, it is advantageous in that the aforementioned lowering in productivity may not occur. On the other hand, as compared to the case where the image processing for removing a linear image is not executed, there is a disadvantage that, in view of characteristics in image processing, image quality of an image is likely to be lowered.

SUMMARY OF THE INVENTION

The present invention was made by further improving the aforementioned conventional technology.

In summary, according to an aspect of the present invention, an image reading apparatus includes: a document conveying section which sequentially conveys a plurality of documents while providing clearances between the documents in a document conveying direction; a first reading section which performs a reading operation at a predetermined first reading position in a main scanning direction with respect to a document which passes through the first reading position in a sub-scanning direction; a first reading controller which controls the first reading section to perform a reading operation for reading an image of the clearance during when the clearance passes through the first reading position; a first determining section which determines presence or absence of a foreign object at the first reading position in accordance with image data obtained by the reading operation based on an instruction from the first reading controller; a second reading controller which controls the first reading section to perform a reading operation for reading a document image during when the document passes through the first reading position; a foreign object image removing processor which removes a foreign object image, which is caused by a foreign object adhered at the first reading position, from an image obtained by the reading operation based on an instruction from the second reading controller; a changing section changes the reading position of the first reading section to a second reading position which is different from the first reading position; an image data creating mode selecting section which receives from a user an instruction of selecting a mode from among a first image data creating mode and a second image data creating mode, the first image data creating mode being adapted for obtaining image data by allowing the first reading section to perform the reading operation at the first reading position and allowing the foreign object image removing processor to execute the foreign object image removing processing with respect to the image data obtained by the reading operation if the first determining section determines that the foreign object is present, the second image data creating mode being adapted for obtaining image data by allowing the first reading section to perform the reading operation at the second reading position without allowing the foreign object image removing processor to execute the foreign object image removing processing with respect to the image data obtained by the reading operation if the first determining section determines that the foreign object is present; and a mode setting section which performs setting of the reading operation and the image creating operation in any one of the selected modes with respect to each section necessary for executing the first image data creating mode or the second image data creating mode selected in accordance with the instruction received by the image data creating mode selecting section.

These and other objects, features and advantages of the present invention will become more apparent upon reading of the following detailed description along with the accompanied drawings.

DETAILED DESCRIPTION OF THE PREFERRED EMBODIMENTS

Figure 1:
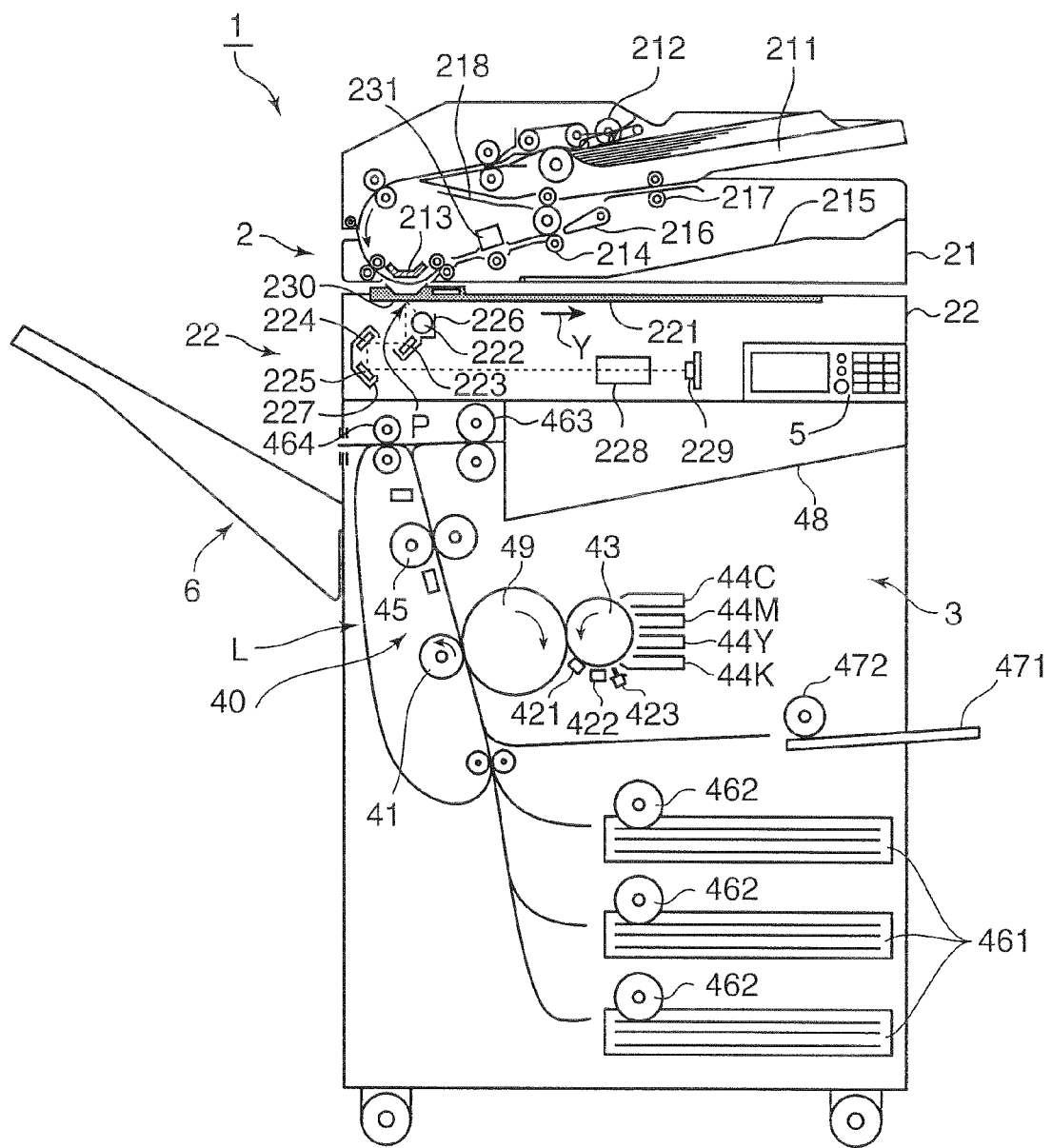
FIG. 1 is a side view schematically showing an internal configuration of a multi-functional peripheral.

Hereinafter, an image reading apparatus and an image forming apparatus in accordance with an embodiment of the present invention will be described with reference to the drawings. In the following embodiment, the image reading apparatus and the image forming apparatus in accordance with the present invention will be described in a form of collectively providing the image reading apparatus and the image forming apparatus in a multi-functional peripheral having a color-copying function, a scanner function, a facsimile function, a printer function, and the like. FIG. 1 is a vertical sectional view schematically showing an internal configuration of a multi-functional peripheral 1 which is an embodiment of the image reading apparatus and the image forming apparatus in accordance with the embodiment of the present invention.

The multi-functional peripheral 1 mainly includes an image reading section 2 and an apparatus main body 3. The image reading section 2 includes a document feeding section (corresponding to a document conveying section and a conveying section in the claims) 21, a scanner section 22, a CIS 231, an operating section 5, a reversing mechanism 4 which will be described later, and a controller 61 (refer to FIG. 3). The document feeding section 21 is an ADF (Automatic Document Feeder), and has a document tray 211, a pickup roller 212, a platen 213, sheet-discharging rollers 214, and a sheet-discharging tray 215. The document tray 211 holds documents to be read. The documents held by the document tray 211 are taken by the pickup roller 212 one after another and conveyed sequentially to the platen 213 while having clearances there between. The documents which have passed through the platen 213 are discharged sequentially to the sheet-discharging tray 215 by the sheet-discharging rollers 214.

At a position facing a peripheral surface of the platen 213 and located before a reading position P, which will be described later, in a document conveying direction, there is provided a timing sensor (detector) 250 (refer to FIG. 10) which detects a document. A document conveying timing to the reading position P is measured in accordance with an output signal from the timing sensor 250. The timing sensor 250 is configured by, for example, a photo-interrupter.

The scanner section (corresponding to a first reading section in the claims) 22 is adapted to optically read a document image to create image data. The scanner section 22 includes a glass 221, a light source 222, a first mirror 223, a second mirror 224, a third mirror 225, a first carriage 226, a second carriage 227, an imaging lens 228, and a CCD (Charge Coupled Device) 229. The CCD 229 is a reduction optical system image sensor. The scanner section 22 adopts a white fluorescent lamp such as a cold cathode fluorescent tube as the light source 222, and guides a light reflected from the document to the CCD 229 by means of the first mirror 223, the second mirror 224, the third mirror 225, the first carriage 226, the second carriage 227, and the imaging lens 228. Since the scanner section 22 is configured by adopting a white fluorescent lamp such as a cold cathode fluorescent tube as the light source 222, it is more advantageous in color reproducibility than a CIS 231, which will be described later, adopting a tricolor LED or the like as a light source. The CIS 231 is a contact type optical system image sensor.

At the time of reading a document by not using the document feeding section 21, a document is placed manually onto the glass 221. The light source 222 and the first mirror 223 are supported by the first carriage 226, and the second mirror 224 and the third mirror 225 are supported by the second carriage 227.

As document-reading methods of the image reading section 2, there are provided a flat-bed reading mode and an ADF reading mode. In the flat-bed reading mode, the scanner section 22 reads a document placed on the glass 221. In the ADF reading mode, a document is taken by the document feeding section 21 (ADF), and the document is read in the course of conveyance.

In the flat-bed reading mode, the light source 222 irradiates a light to the document placed on the glass 221, and a reflected light for one line in the main scanning direction is reflected by the first mirror 223, the second mirror 224, and the third mirror 225 sequentially and enters the imaging lens 228. The light incident to the imaging lens 228 is focused on a receiving surface of the CCD 229. The CCD 229 is one-dimensional image sensor and processes image data for one line of the document simultaneously. The first carriage 226 and the second carriage 227 is so configured as to move in a direction orthogonal to the main scanning direction (sub-scanning direction; the direction of an arrow Y).

In the ADF reading mode, the document feeding section 21 takes the documents placed on the document tray 211 one after another by means of the pickup roller 212. At this time, the first carriage 226 and the second carriage 227 are arranged at a predetermined reading position (the first reading position) P located below a reading slit 230. When the document is conveyed by the document feeding section 21 and passes through the reading slit 230 provided on the conveying path from the platen 213 to the sheet-discharging tray 215, the light source 222 irradiates a light to the document, and a reflected light from the document for one line in the main scanning direction is reflected by the first mirror 233, the second mirror 224, and the third mirror 225 sequentially and enters the imaging lens 228. The light incident to the imaging lens 228 is focused on the receiving surface of the CCD 229.

Further, the document feeding section 21 includes a document reversing mechanism (reversing section) having a switching guide 216, reversing rollers 217 and reversing conveying passage 218. The document reversing mechanism reverses a document whose one side (one side of the document) is read firstly by the ADF reading and conveys again to the reading slit 230, so that a back side (the other side of the document) is read by the CCD 229 again. The document reversing mechanism is operated only at the time of conducting a double-sided reading, and the document reversing mechanism is not operated at the time of conducting a one-sided reading. After the one-sided reading is conducted, or after a back side is read at the time of the double-sided reading is conducted, the switching guide 216 is switched upwardly, and then the document which has passed through the platen 213 is discharged to the sheet-discharging tray 215 by the sheet-discharging rollers 214. After a front side is read at the time of conducting the double-sided reading, the switching guide 216 is switched downwardly, and then the document which has passed through the platen 213 is conveyed by the reversing rollers 217 to the reversing conveying passage 218. Thereafter, the switching guide 216 is switched upwardly, and the reversing rollers 217 rotate in a reversed direction, so that the document is supplied to the platen 213 again. Hereinafter, the mode of reading both sides of the document by means of the document reversing mechanism will be referred to as "double-sided reversing reading mode".

Further, in the ADF reading mode, the image reading section 2 in accordance with the present embodiment is capable of allowing the CCD 229 (scanner section 22) to read a front side of the document and allowing the CIS (second reading section) 231 to read a back side of the document substantially simultaneously. In this case, a front side of the document conveyed by the document feeding section 21 from the document tray 211 is read by the CCD 229 when the document passes through the reading slit 230, and a back side is further read when the document passes through a part at which the CIS 231 is arranged. The CIS 231 adopts a tricolor LED of RGB and the like as a light source. By using the CCD 229 and the CIS 231 as described above, front and back sides of the document can be read in one-time document conveying operation (one path) from the document tray 211 to the sheet-discharging tray 215 performed by the document feeding section 21. Hereinafter, the mode of allowing the CCD 229 and the CIS 231 to read both sides of the document will be referred to as "double-sided simultaneous reading mode".

The double-sided reversing reading mode and the double-sided simultaneous reading mode are provided as reading modes for reading both sides of the document by using the ADF reading mode. The double-sided reversing reading mode is used in the case where it is desired that image quality of print images on both sides be uniform. On the other hand, the double-sided simultaneous reading mode is used in the case where it is desired that shortening the reading time should be prioritized even if image quality in print images on both sides differ. The multi-functional peripheral 1 in accordance with the present embodiment is initially set to be the double-sided simultaneous reading mode. Therefore, if a mode setting operation for setting the reading mode is not performed, and an image forming instruction inputted, the image reading operation for reading the document is performed in the double-sided simultaneous reading mode.

The multi-functional peripheral 1 includes the apparatus main body 3 and a stack tray 6 provided on the left side of the apparatus main body 3. The apparatus main body 3 includes a plurality of sheet-feeding cassettes 461, sheet-feeding rollers 462 which feed recording sheets from the sheet-feeding cassettes 461 one after another and convey the recording sheets to an image forming section 40, and the image forming section 40 which forms an image on the recording sheet conveyed from the sheet-feeding cassette 461. Further, the apparatus main body 3 includes a sheet-feeding tray 471 and a sheet-feeding roller 472 which feeds recording sheets placed on the sheet-feeding tray 471 one after another to the image forming section 40.

The image forming section 40 includes a charge-removing device 421 which removes remaining electric charge from a surface of a photosensitive drum 43, a charging device which charges the surface of the photosensitive drum 43 from which the charge has been removed, an exposure device which irradiates a laser light to the surface of the photosensitive drum 43 in accordance with the image data obtained by the scanner section 22 to form an electrostatic latent image on the surface of the photosensitive drum 43, developing devices 44K, 44Y, 44M, 44C which form toner images of cyan (C), magenta (M), yellow (Y) and black (K) respectively onto the photosensitive drum 43 in accordance with the electrostatic latent image, a transfer drum 49 onto which the toner images of respective colors formed on the photosensitive drum 43 are transferred and superimposed, a transferring device 41 which transfers the toner image from the transfer drum 49 to the recording sheet, and a fixing device 45 which heats the sheet, on which the toner image is transferred, to fix the toner image on the recording sheet. The toner of cyan, magenta, yellow, and black is supplied from unillustrated toner containers (toner cartridges) to the respective developing devices. Further, there are provided conveying rollers 463, 464 and the like which convey the recording sheet having passed through the image forming section 40 to the stack tray 6 or the sheet-discharging tray 48.

In the case of forming images on both sides of the recording sheet, an image is formed on one side of the recording sheet in the image forming section 40, and thereafter the recording sheet is sandwiched by the conveying rollers 463 on the side of the sheet-discharging tray 48. The conveying rollers 463 are reversely rotated in this state to switch back the recording sheet. Then, the recording sheet is sent to a sheet-conveying passage L and conveyed again to an upstream region of the image forming section 40. After forming an image on the other side of the recording sheet in the image forming section 40, the recording sheet is discharged to the stack tray 6 or the sheet-discharging tray 48.

Figure 2:
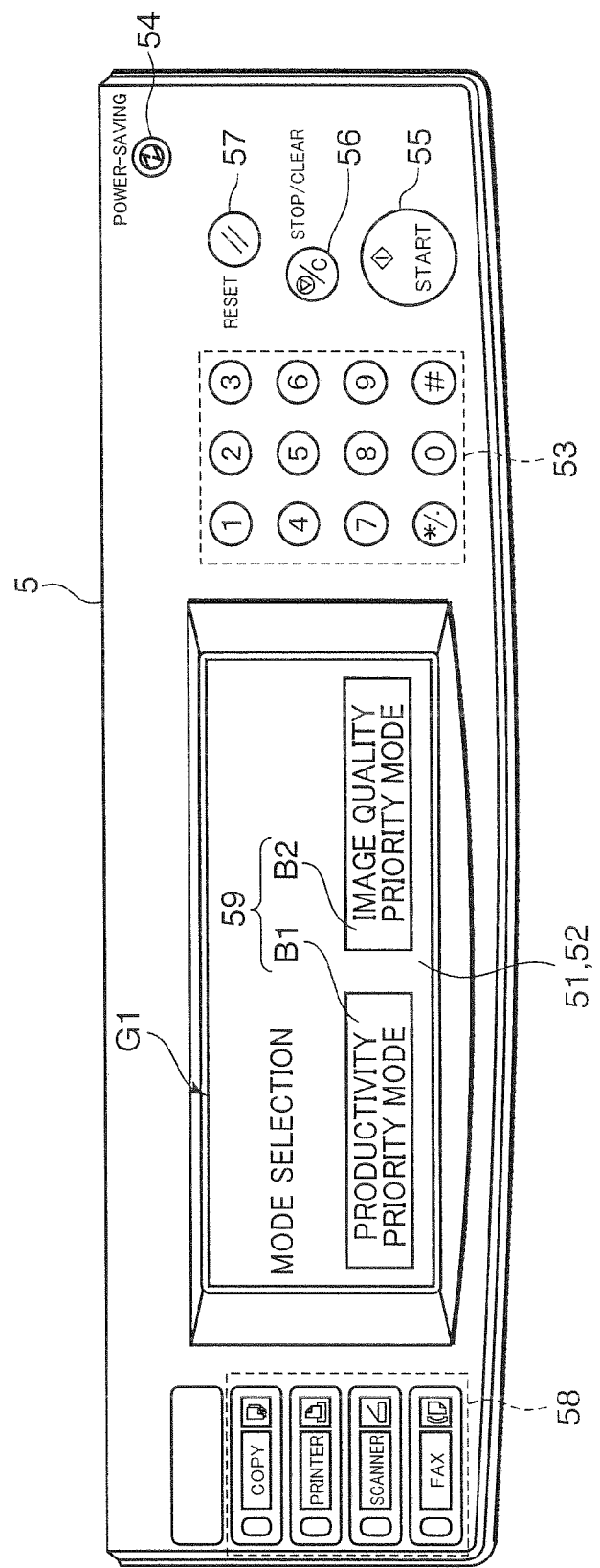
FIG. 2 is an example of a front view of an operating section.

Further, on a front side of the apparatus main body 3, there is provided an operating section 5 having a display section for allowing a user to visually confirm an operation screen, various messages, and the like and operation buttons for allowing a user to input various operation commands. FIG. 2 is an example of a front view of the operating section 5. The operating section (image data creating mode selecting section) 5 includes a display section 51, a touch panel 52, a numerical key group 53, operation buttons 54-57, function selection buttons 58, and the like. The display section 51 is configured by an LCD (Liquid Crystal Display), an ELD (Electronic Luminescent Display), or the like and displays operation guide screen for a user, such as a recording sheet size selection, a magnification selection, a density selection, and the like. This display section 51 is formed to be integral with the touch panel 52. The touch panel 52 detects a touched position user when a touching operation is performed by a user, and outputs a detection signal indicating the touched position to the controller 61 which will be described later.

The numerical key group 53 is adapted to allow a user to input, for example, the number of copies in the case of operating the copying function of the multi-functional peripheral 1 and phone numbers and the like of a destination in the case of operating the facsimile function. A power-saving button 54 is used for switching the multi-functional peripheral 1 to a power-saving (low power) mode. A start button 55 is adapted to start the copying operation, the scanner operation, and the like. A stop/clear button 56 is adapted to stop the copying operation, the scanner operation, and the like and cancel the input operation. A reset button 57 is adapted to set display on the display section 51 and various setting to be an initial state or a default operation state. A function selection button 58 constitutes the transmission mode selection section and is adapted to set the copying function, the printer function, the scanner function, and the facsimile function.

Figure 3:
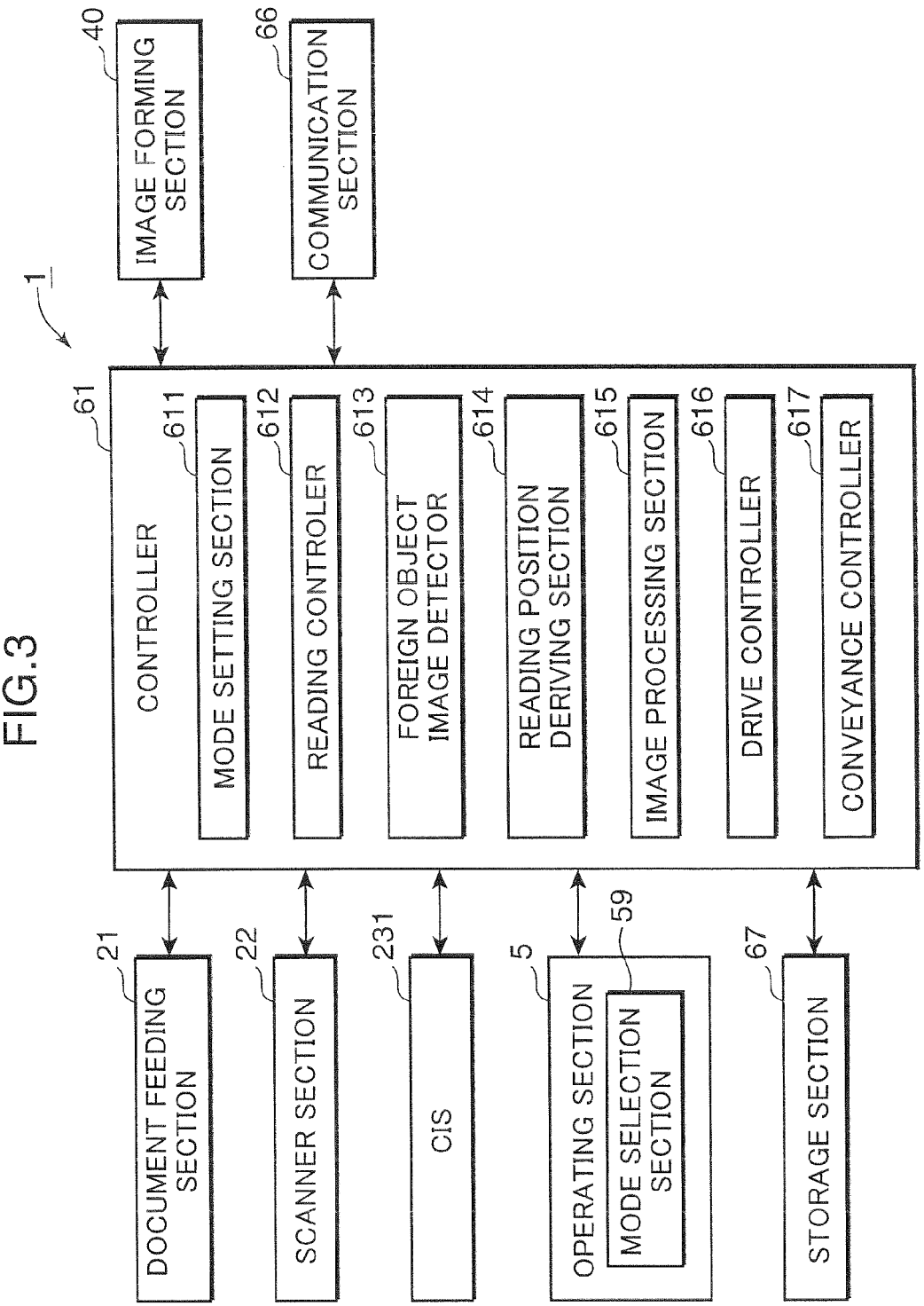
FIG. 3 is a block diagram showing an electric configuration of the multi-functional peripheral.

FIG. 3 is a block diagram showing an electric configuration of the multi-functional peripheral 1. The parts which are the same as those shown in FIGS. 1 and 2 will be identified by the same reference numbers, and description regarding those will be omitted. The multi-functional peripheral 1 includes the document feeding section 21, the scanner section 22, the CIS 231, the operating section 5, the image forming section 40, a communication section 66, a storage section 67, and the controller 61.

When the copying and scanning of the document is performed in the ADF reading mode, the document feeding section 21 takes the document placed on the document tray 211 and conveys the document so that the document can be read by the CCD 229 and the CIS 231. The operating section 5 corresponds to the operating section 5 shown in FIG. 1. The scanner section 22 and the CIS 231 correspond to the scanner section 22 and the CIS 231 shown in FIGS. 1 and 2.

The operating section 5 is used by a user for operations related to the copying function, the printer function, the facsimile function, the scanner function, and the like and gives an operation instruction (command) and the like from a user to the controller 61. The operating section 5 includes a display section 51 having a touch panel and the like, and the start button 55, the numerical key group 53, and the like for input of various instruction from a user such as a copying start instruction, a facsimile transmission start instruction and the like.

The image forming section 40 is adapted to form an image on a recording sheet in accordance with the image data obtained by the CCD 229 or the CIS 231 or image data transferred from the personal computer, the facsimile machine, or the like through the communication section 66. The communication section 66 adopts an unillustrated network interface and transmits/receives various data to/from external devices such as a computer, a facsimile machine, and the like connected through the network.

The storage section 67 includes a storage section which stores image data obtained by the reading operation of the scanner section 22 and the CIS 231, image data processed by the controller 61 which will be described later, and the like, and a storage section for storing names of receivers and facsimile numbers for short-cut button registration for the facsimile communication, or IP addresses of receivers for use as a network scanner.

The controller 61 is adapted to control overall operations of the multi-functional peripheral 1 and is configured by a CPU, RAMs, ROMs, and the like. The document feeding section 21, the scanner section 22, the CIS 231, the operating section 5, the image processing section 615, the image forming section 40, and the communication section 66 are operated under a control by the controller 61. The controller 61, in accordance with various instruction signals and the like inputted by a user through the operating section 5, executes a processing in accordance with an operation control signal stored in an unillustrated ROM or the storage section 67 to output instruction signals and transfer data to respective function sections to totally control the multi-functional peripheral 1.

Meanwhile, in the multi-functional peripheral 1 having the configuration as described above, if a foreign object adheres to the reading slit 230 in the case where the image reading section 2 performs reading operation with respect to the document conveyed by the document feeding section 21 in the ADF mode, the same pixel in the scanner section 22 takes an image of the foreign object at each imaging timing. This may cause a linear image extending in the sub-scanning direction (the line L in FIG. 4; hereinafter, referred to as "foreign object image") to be formed in the obtained image at a position corresponding to the pixel position of the same pixel in the main scanning direction.

If such situation is left untreated until the reading operation with respect to all of documents of a document stack is completed, the foreign object image may occur in all of images obtained by the reading operation, thus a copy which is not desired by a user is created. The multi-functional peripheral 1 of the present embodiment adopts a technology which will be described hereinafter to solve this problem.

Firstly, the multi-functional peripheral 1 performs a reading operation at the timing when a predetermined position (clearance) between a document and a previously conveyed document (or a subsequently conveyed document) arrives at the reading position P, in addition to the normal image reading operation (image reading operation with respect to a document) for each document. In other words, as shown in FIG. 4, the multi-functional peripheral 1 performs the normal reading operation with respect to the nth (n is an integer equal to or greater than 1), and additionally performs a reading operation at a predetermined position Cn−1 between a rear end edge of an (n−1)th document and a leading edge of the nth document (or at a predetermined position Cn between a rear end edge of the nth document and a leading edge of an (n+1)th document.

Then, the multi-functional peripheral 1 determines whether image data obtained by the reading operation includes an image data caused by the foreign object (hereinafter, referred to as "foreign object image data"). If the foreign object image data is included, the multi-functional peripheral 1 detects the position of the foreign object based on the foreign object image data.

Figure 4:
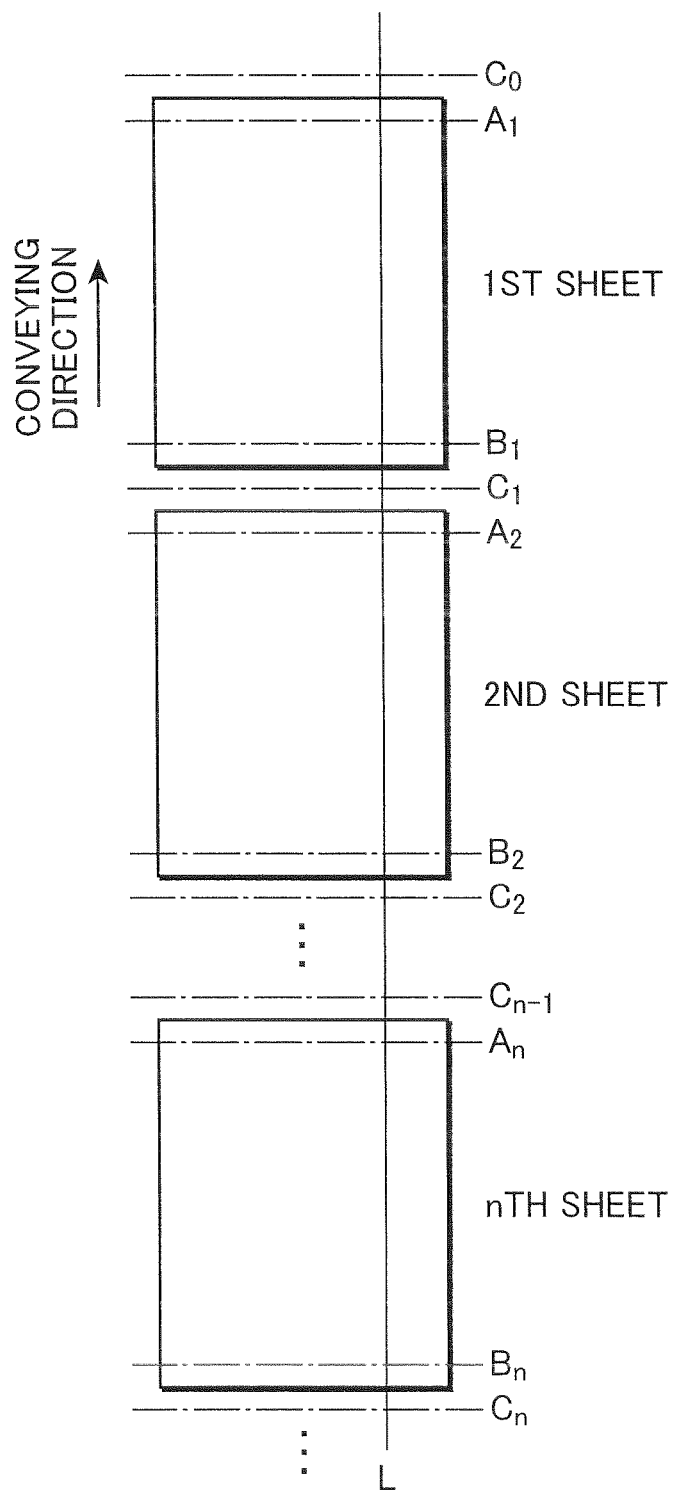
FIG. 4 shows arrangement of documents to be conveyed sequentially to a reading position by a document conveying section, where a document conveying passage through which a document is conveyed to a reading position by the image conveying section is depicted as a straight line.

FIG. 4 shows arrangement of documents to be conveyed sequentially to the reading position P by the document feeding section 21, where the document conveying passage through which the documents are conveyed to the reading position P by the document feeding section 21 is depicted as a straight line.

Here, the multi-functional peripheral 1 has two modes as operation modes of respective parts for the case where the foreign object image data is detected. One of the modes is a mode of allowing the scanner section 22 to perform the reading operation without movement of the first and second carriages 226, 227, executing the image processing for removing the foreign object image (foreign object image removing processing which will be described later) in accordance with image data obtained by the reading operation at a predetermined reading position P, and forming an image on a recording sheet based on the image-processed image data. The other mode is a mode of allowing the first and second carriages 226, 227 to move from the reading position P to the reading position P' (a second reading position) where the foreign object is not adhered and allowing the scanner section 22 to perform the reading operation, and forming an image to the recording sheet in accordance with image data obtained by the reading operation, without executing the image processing.

Comparing the former mode with the latter mode, the latter mode temporarily stops conveyance of the document to secure the time for moving the first and second carriages 226, 227, and on the other hand, the former mode does not temporarily stop the conveyance of the document. Thus, the former mode can perform the reading operation and the image forming operation with respect to the greater number of documents than the latter mode. Further, the former mode performs the image processing for removing the foreign object image. In view of the characteristics of this image processing, if the image processing is executed, image quality is more likely to be lowered as compared to the case of not executing the image processing. From the above reasons, in the following description, the former mode will be referred to as a productivity priority mode, and the latter mode will be referred to as an image quality priority mode.

The multi-functional peripheral 1 in accordance with the present embodiment is so configured that a user can select a mode from these modes (the productivity priority mode and the image quality priority mode). This mode selection can be made through, for example, a mode selection screen G1 displaced on the display section 51 shown in FIG. 2. If a user performs a predetermined operation with respect to the operating section 5, the mode selection screen G1 shown in FIG. 2 is displayed by the display section 51.

As shown in FIG. 2, the mode selection screen G1 displays a button B1 for selecting the productivity priority mode and a button B2 for selecting the image quality priority mode. By pressing the button B1 or the button B2, a mode signal indicating the mode corresponding to the button is outputted from the touch panel 52 to the controller 61. The mode selecting portion 59 (refer to FIG. 3) is configured by the button B1 and the button B2.

To realize the aforementioned function, as shown in FIG. 3, the controller 61 has functions as a mode setting section 611, reading controller 612, a foreign object image detector 613, a reading position deriving section 614, an image processing section 615, a drive controller 616, and a conveyance controller 617.

The mode setting section 611 sets the mode of the multi-functional peripheral 1 to be the mode selected by the mode selecting section 59 in accordance with a mode signal from the touch panel 52. In other words, in the case where the productivity priority mode is selected by the mode selecting section 59, the mode of the multi-functional peripheral 1 is set to be the productivity priority mode. In the case where the image quality priority mode is selected by the mode selecting section 59, the mode of the multi-functional peripheral 1 is set to be the image quality priority mode.

The reading controller (corresponding to a first reading controller and a second reading controller in the claims) 612 controls the reading operation of the respective parts, such as the scanner section 22 and the CIS 231, of the image reading section 2. In the present embodiment, the reading controller 612 controls the image reading section 2 to perform the usual image reading operation for each document, and further controls the reading section 2 to perform the reading operation at the timing when the position $C_{n-1}$ (n is an integer which is equal to or greater than 1) passes through the reading position P.

The foreign object image detector (corresponding to a first determining section and a second determining section in the claims) 613, in accordance with image data obtained by the reading operation performed by the image reading section 2, detects presence or absence of the foreign object indirectly by detecting presence or absence of foreign image created due to presence of the foreign object As mentioned above, since the surface of the platen 213 facing the reading slit 230 is white, an exposure lamp 20 of the image reading section 2 irradiates a light to the white surface of the platen 213 in the reading operation which is performed at the timing when the position $C_{n-1}$ passes through the reading position P.

Thus, in the case where the foreign object is not present at the reading slit 230 at the timing when the position $C_{n-1}$ passes through the reading position P, image data for one line in the main scanning direction obtained at the aforementioned timing has a relatively large pixel value corresponding to white color uniformly in the main scanning direction.

On the other hand, in the case where the foreign object is present at the reading slit 230 at the timing when the position $C_{n-1}$ passes through the reading position P, image data for one line in the main scanning direction obtained at the aforementioned timing has relatively small pixel values due to the presence of the foreign object and relatively large pixel values.

In accordance with the aforementioned states, the foreign object image detector 613 executes the processing of detecting an image which is caused by the foreign object (hereinafter, referred to as "foreign object image"). In other words, in the present embodiment, the foreign object image detector 613 executes detection with respect to the image data obtained by the reading operation at the timing when the position $C_{n-1}$ passes through the reading position P to determine whether image data has pixel values smaller than a predetermined threshold value and relatively large pixel values. If the image data has a pixel values smaller than the threshold value and relatively large pixel values, the foreign object image detector 613 detects the pixel data having pixel values smaller than the threshold value as the foreign object image data.

The reading position deriving section 614, in the case where the foreign object image is detected by the foreign object image detector 613, detects a position of the reading slit 230 where the foreign object does not adhere, and derives the position as a destination reading position of the scanner section 22.

Figure 5:
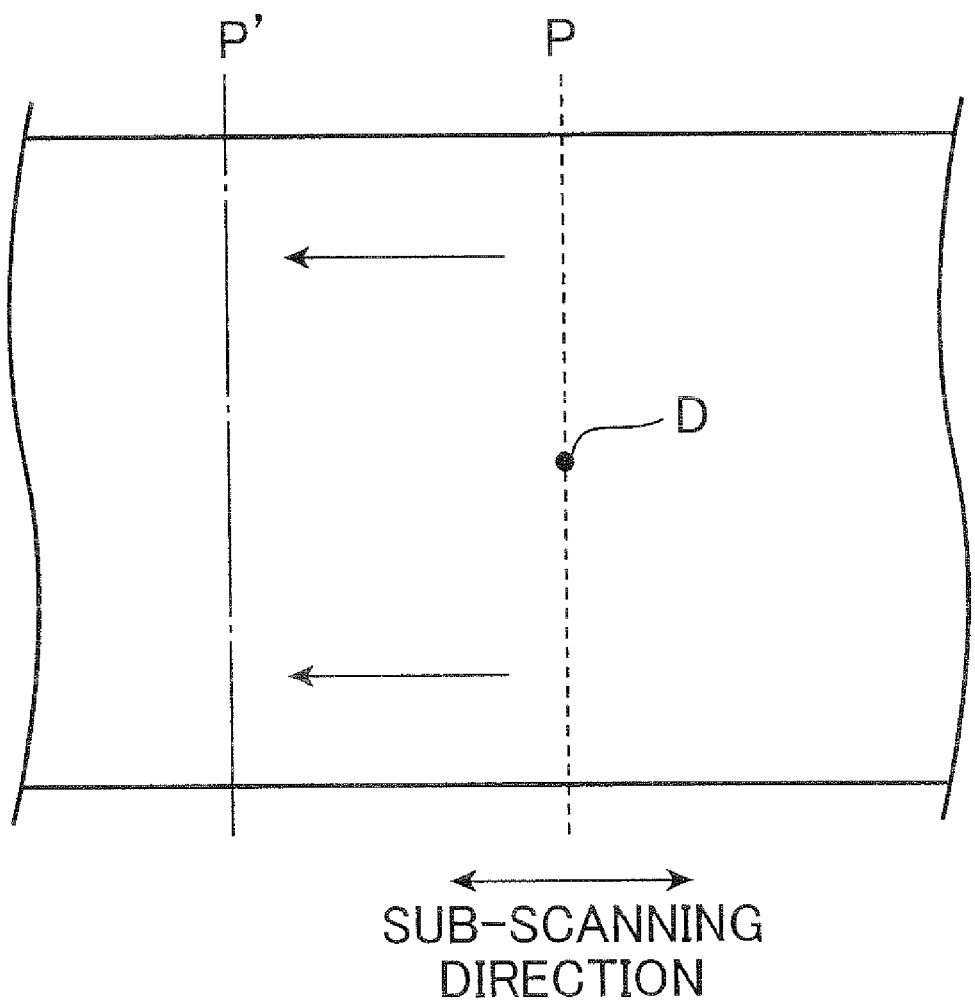
FIG. 5 shows a state where the reading position of a scanner section is changed from a reading position P to a reading position P' if a foreign object D is present at the reading position P.

FIG. 5 shows a state where the reading position of the scanner section 22 is changed from the reading position P to the reading position P' in the case where the foreign object D is present at the reading position P.

The image processing section (a foreign object image removing processor) 615 executes various image processing related to image data. For example, the image processing section 615 executes a correction processing such as a shading correction, a level correction, a gamma correction, a chromatic aberration correction, an MTF (Modulation Transfer Function) correction, and a scanner color correction, and a image processing such as a compression/expansion processing, a enlargement/reduction processing, and the like with respect to image data obtained by the CCD 229 or the CIS 231, or image data transferred through the communication section 66 from a personal computer connected to a network, or a facsimile machine connected through a public phone line, or the like.

Further, in the case where the productivity priority mode is set by the mode setting section 611, when the foreign object image is detected by the foreign object image detector 613, the image processing section 615 executes the foreign object image removing processing to remove the foreign object image from the image data obtained by the reading operation of reading the image of the document. As the foreign object image removing processing, for example, a known processing of calculating an average of a plurality of image data constituting an image positioned in periphery of the foreign object image and adopting average data in place of the foreign object image data can be adopted.

The drive controller (a changing section) 616 controls operation of an unillustrated motor which moves the first and second carriages 226, 227 in the sub-scanning direction, and the conveyance controller (a conveyance controller) 617 controls a document conveying operation performed by members and mechanisms associated with conveyance of a document.

Here, in the present embodiment, in the case where the image quality priority mode is set by the mode setting section 611, when the foreign object image is detected by the foreign object image detector 613, the conveyance controller 617 stops conveyance of the document for a predetermined period of time, and the drive controller 616 moves the first and second carriages 226, 227 in the sub-scanning direction, so that the reading position of the scanner section 22 is shifted from the reading position P to the reading position P' during the period in which the conveyance of the document is stopped. As the predetermined time period, a time period which is sufficient for completing the movement of the first and second carriages 226, 227 is set.

Figure 6:
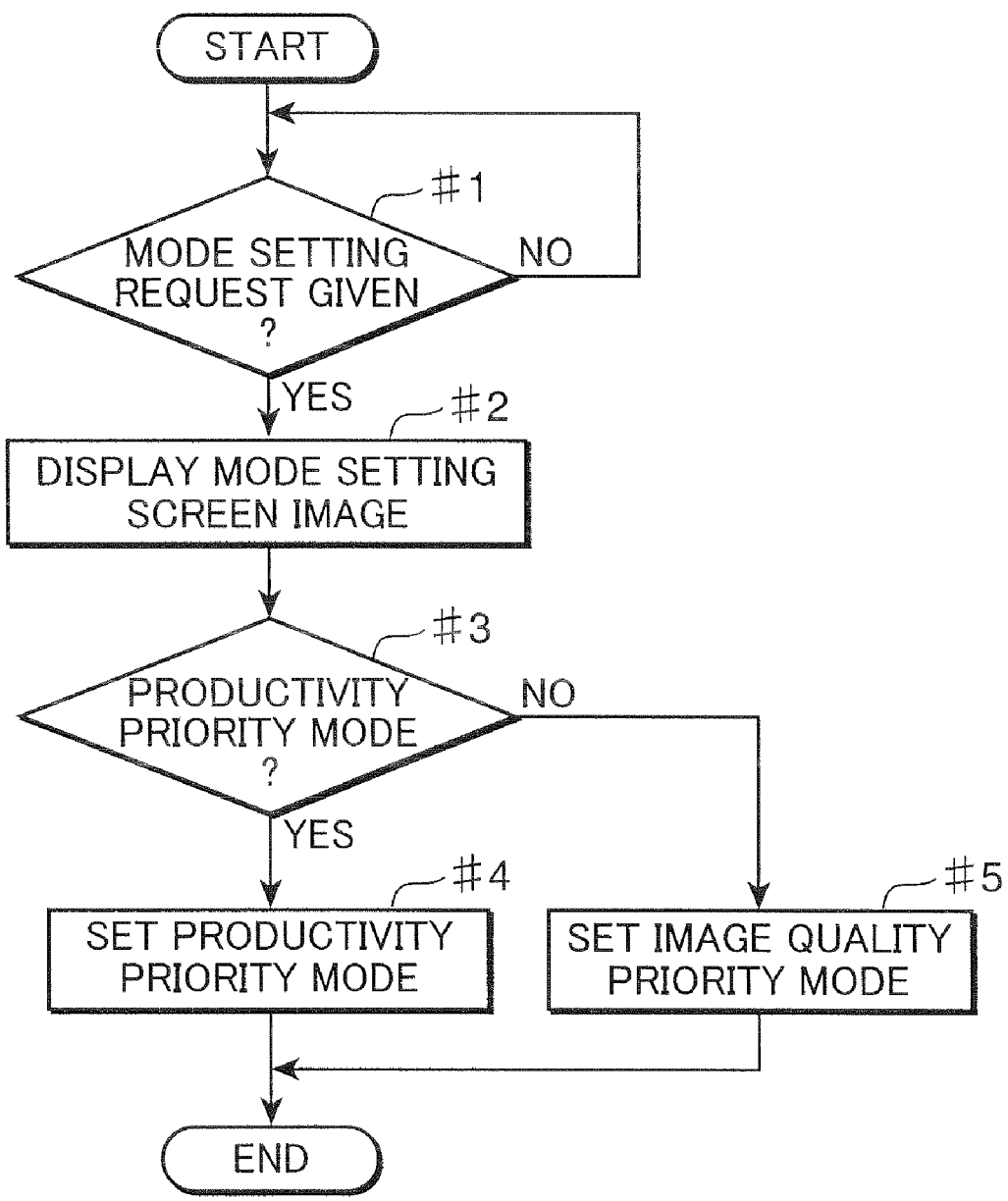
FIG. 6 is a flowchart showing a mode setting processing executed by a controller.

FIG. 6 is a flowchart showing the mode setting processing executed by the controller 61.

As shown in FIG. 6, if a predetermined operation requesting setting of the productivity priority mode or the image quality priority mode is performed with respect to the operating section 5 (YES in step #1), the mode setting section 611 allows the display section 51 to display the mode selection screen G1 shown in FIG. 2 (step #2). In the mode selection screen G1, if the button B1 for selecting the productivity priority mode is pressed (YES in step #3), the mode setting section 611 sets the mode of the multi-functional peripheral 1 to be the productivity priority mode (step #4). On the other hand, if the button B2 for selecting the image quality priority mode is pressed (NO in step #3), the mode setting section 611 sets the mode of the multi-functional peripheral 1 to be the image quality priority mode (step #5).

Figure 7:
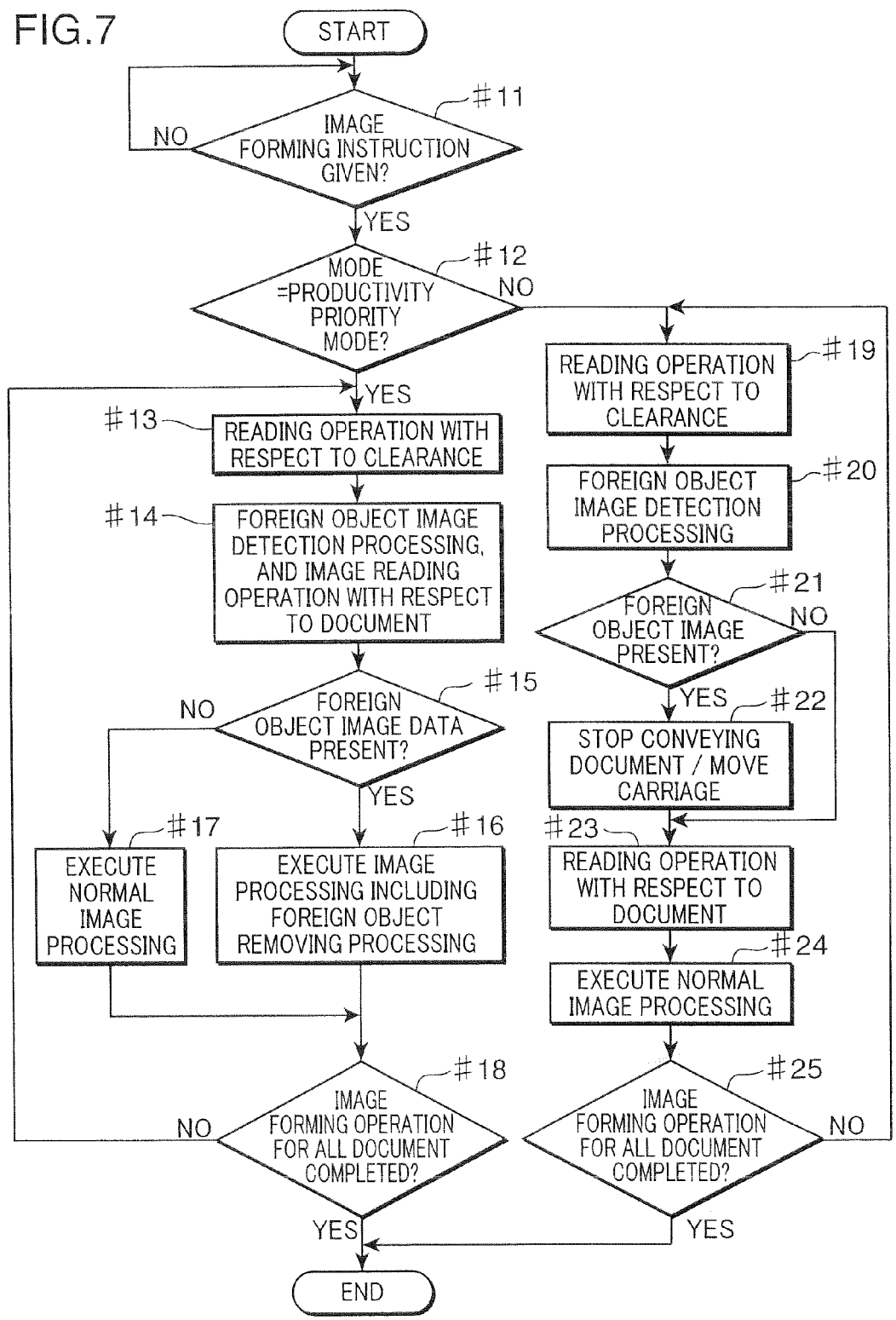
FIG. 7 is a flowchart showing a processing executed by the controller in a productivity priority mode and an image quality priority mode.

FIG. 7 is a flowchart showing the processing of the controller 61 in the productivity priority mode and the image quality priority mode.

As shown in FIG. 7, if an image forming instruction is inputted by the start button 55 (YES in step #11), the reading controller 612 determines whether the mode currently set in the multi-functional peripheral 1 is the productivity priority mode or the image quality priority mode (step #12).

If it is determined that the mode currently set in the multi-functional peripheral 1 is the productivity priority mode (YES in step #12), the controller 61 executes the processing of steps #13-#18. On the other hand, if it is determined that the mode currently set in the multi-functional peripheral 1 is the image quality priority mode (NO in step #12), the controller 61 executes the processing of steps #19-#25.

In other words, it is determined that the mode currently set in the multi-functional peripheral 1 is the productivity priority mode (YES in step #12), the reading controller 612 controls the scanner section 22 to perform the reading operation with respect to the clearance between the documents (step #13), and the foreign object image detector 613 executes the foreign object image detection processing of detecting whether the foreign object image data is included in the image data obtained by the reading operation mentioned above and controls the scanner section 22 to perform the reading operation with respect to the document (step #14).

As a result of the foreign object image detection processing in step #14, if the foreign object image is detected by the foreign object image detector 613 (YES in step #15), the image processing section 615 executes the image processing, including the image processing (foreign object image removing processing) for removing the foreign object image, with respect to the image data obtained by the reading operation in step #14 with respect to the document (step #16). On the other hand, if the foreign object image is not detected by the foreign object image detector 613 (NO in step #15), the image processing section 615 executes the normal image processing, not including the foreign object image removing processing, with respect to the image data obtained by the reading operation in step #14 with respect to the document (step #17).

Until the image forming operation is completed for all of the documents (NO in step #18), the controller 61 repeatedly executes the processing of steps #13-#18. If the image forming operation is completed for all of the documents (YES in step #18), the series of processing is terminated.

On the other hand, in step #12, if it is determined that the mode currently set in the multi-functional peripheral 1 is the image quality priority mode (NO in step #12), the reading controller 612 controls the scanner section 22 to perform the reading operation with respect to the clearance between the documents (step #19), and the foreign object image detector 613 executes the foreign object image detection processing for determining whether the foreign object image data is included in the image data obtained by the reading operation mentioned above (step #20).

As a result of the foreign object image detection processing in step #20, if the foreign object image detector 613 detects the foreign object image data (YES in step #21), the conveyance controller 617 stops conveyance of the document, and the reading position deriving section 614 detects the position P' in the reading slit 230, at which the foreign object does not adhere, and derives the position P' to which the reading position of the scanner section 22 is changed, and the drive controller 616 moves the first and second carriages 226, 227 in the sub-scanning direction so that the reading position of the scanner section 22 becomes the reading position P' (position at which the foreign object doe not adhere) (step #22).

After that, the conveyance controller 617 restarts the conveyance of the document, and the reading controller 612 controls the scanner section 22 to perform the reading operation with respect to the document (step #23), and the image processing section 615 executes the usual image processing, not including the foreign object image removing processing, with respect to the image data obtained by the reading operation in step #23 (step #24).

Until the image forming operation is completed for all of the documents (NO in step #25), the controller 61 repeatedly executes the processing of step #19-#25. If the image forming operation is completed for all of the documents (YES in step #25), the series of processing is terminated.

As described above, in the present embodiment, since the multi-functional peripheral 1 has the mode selecting section 59 for allowing a user to select the mode from the productivity priority mode and the image quality priority mode, a user can use the mode selecting section 59 to select a desirable mode from the productivity priority mode and the image quality priority mode. Accordingly, occurrence of the foreign object image can be prevented or suppressed in a manner desired by a user.

The present invention can adopt the following modified forms in place of the above-described embodiment or in addition to the above-described embodiment.

[1] Like the first embodiment, there is also a case where the foreign object adheres to the reading position of the CIS 231 other than a case where the foreign object adheres to the reading position of the scanner section 22. Here, since the CIS 231 is fixedly provided at a predetermined position and cannot change the reading position unlike the scanner section 22, the same mode as the image quality priority mode cannot be applied to the CIS 231.

Therefore, in the case where it is detected that the foreign object adheres to the reading position of the CIS 231 in the double-sided simultaneous reading mode, there may be adopted an operation of stopping the reading operation by the CIS 231, reversing the document with the document reversing mechanism, conveying the document to the scanner section 22, and performing the reading operation by the scanner section 22 with respect to the document.

Further, in this case, if it is detected that the foreign object also adheres to the reading position of the scanner section 22, the controller 61 may control operation of the respective sections in accordance with the mode set by the mode selecting section 51 like the first embodiment.

To realize the configuration mentioned above, the foreign object image detector 613 also detects whether the foreign object image data is included in the image data obtained by the reading operation with the CIS 231. If the foreign object image data is detected by the foreign object image detector 613, the conveyance controller 617 controls the document reversing mechanism to perform the reversing operation to reverse the document and allow the document to be conveyed to the reading position of the scanner section 22. After the reading operation is performed by the scanner section 22, the conveyance controller 617 reverses the document and discharges the same to the sheet-discharging tray 215. The reading controller 612 controls the scanner section 22 to perform the reading operation also with respect to the document (back side of the document) to which the initial reversing operation is performed by the document reversing mechanism.

Figure 8:
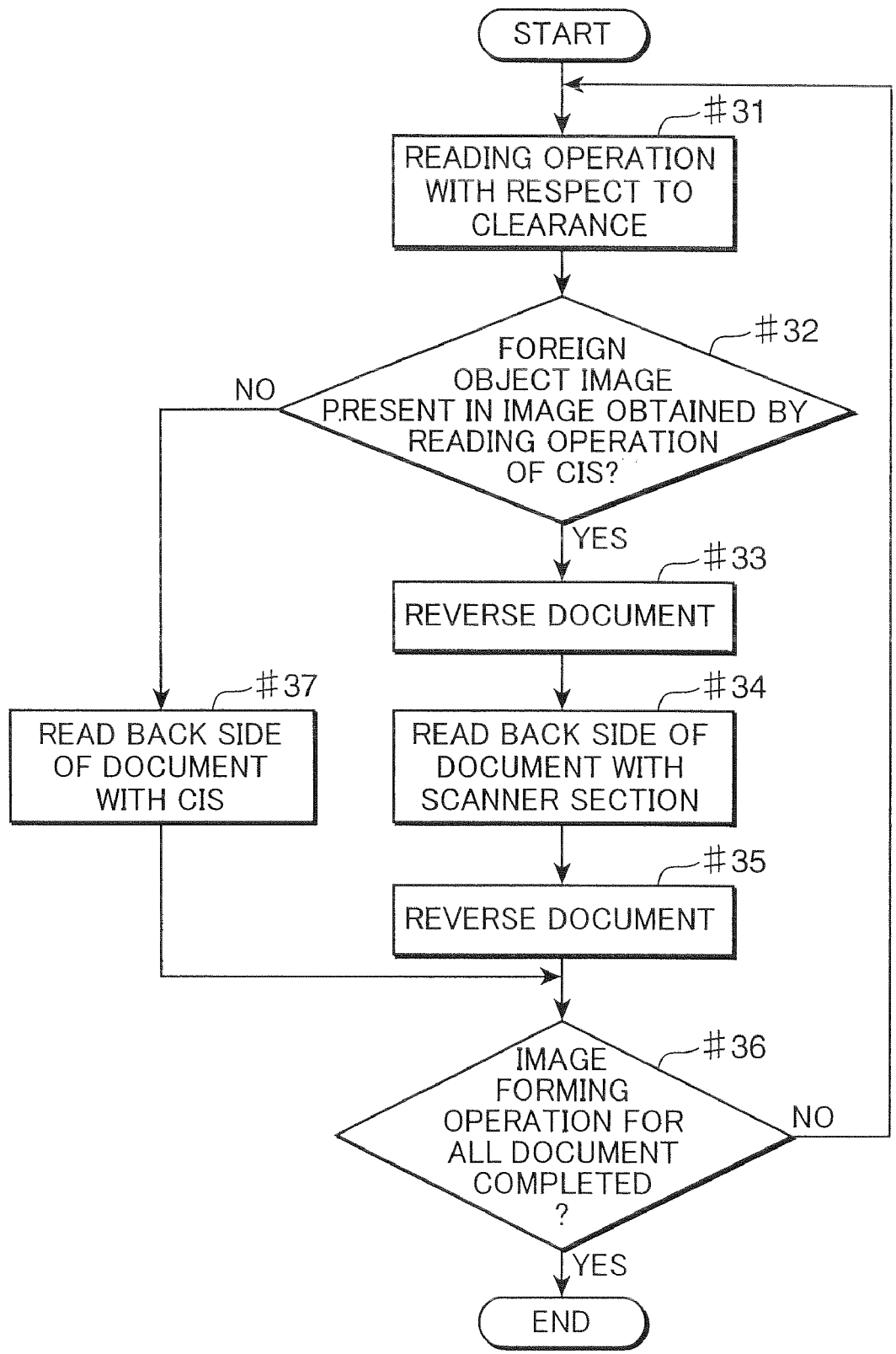
FIG. 8 is a flowchart showing a processing executed by the controller if a foreign object is present at a reading position of a CIS.

FIG. 8 is a flowchart showing the processing executed by the controller 61 in the case where the foreign object is present at the reading position of the CIS 231 in the double-sided simultaneous reading mode. Here, it is assumed that the foreign object is not present at the reading position of the scanner section 22. Further, FIG. 8 shows the processing only focusing on the back side of the document, and the same processing as FIG. 7 is applied to the front side of the document.

As shown in FIG. 8, the reading controller 612 controls the CIS 231 to perform the reading operation with respect to the clearance between the documents (step #31), and the foreign object image detector 613 executes the foreign object image detection processing for detecting whether the foreign object image data is included in the image data obtained by the reading operation mentioned above (step #32).

As a result of the foreign object image detection processing in step #32, if the foreign object image data is detected by the foreign object image detector 613 (YES in step #32), the reading controller 612 controls the CIS 231 to stop the reading operation, and the conveyance controller 617 controls the document reversing mechanism to perform the reversing operation to reverse the document and conveys the document to the reading slit 230 of the scanner section 22 (step #33), and the reading controller 612 controls the scanner section 22 to perform the reading operation with respect to the back side of the document (step #34). Further, the document is reversed and discharged by the control of the conveyance controller 617 (step #35).

Until the image reading operation is completed for all of the documents (NO in step #36), the controller 61 repeatedly executes the processing of steps #31-#36. If the image forming operation is completed for all of the documents (YES in step #36), the series of processing is terminated.

On the other hand, as a result of the foreign object image detection processing in step #32, if the foreign object image is not detected by the foreign object image detector 613 (NO in step #32), the reversing operation is not performed by the document reversing mechanism, and the reading controller 612 controls the CIS 231 to perform the reading operation with respect to the back side of the document (step #37).

As described above, in the present embodiment, in the case where the foreign object is present at the reading position of the CIS 231, the image on the back side which should be read by the CIS 231 is read by the scanner section 22. Accordingly, occurrence of the foreign object image on the copy of the image on the back surface of the document can be also avoided.

Further, if the foreign object image is not detected, the reversing operation performed by the document reversing mechanism is stopped, and the reading operation with respect to the back side of the document is performed by the CIS 231 again. Therefore, as compared to the case of continuously performing the reversing operation and allowing the scanner section 22 to perform the reading operation with respect to the back side even after the foreign object image is not detected, lowering in productivity due to loss of time caused by the reversing operation of the document or re-conveying operation of the document to the reading position of the scanner section 22 can be suppressed.

Here, the operation of controlling the scanner section 22 to read the back side of the image which should be read by the CIS 231 in the case where the foreign object is present at the reading position of the CIS 231 is limited to the operation for the case where the double-sided simultaneous reading mode is set. However, for example, as a configuration of switching the double-sided reversing reading mode and the double-sided simultaneous reading mode for each page, it may be so configured that the scanner section 22 reads the back side of the image which should be read by the CIS 231 in the case where the foreign object is present at the reading position of the CIS 231.

[2] In the case where the multi-functional peripheral 1 performs the processing of sending the image data obtained by the reading operation to another electronic equipment, for example, like the facsimile function, the scanner function, and the like, there may be the case where the another electronic equipment which has received the image data cannot detect the foreign object image in accordance with the image data, or there may be the case where the detection takes a long time even if the foreign object image could be detected. Further, in relation to the order of executing the image processing, the multi-functional peripheral 1 cannot execute in advance the foreign object image removing processing prior to the various image processing executed by the another electronic equipment in the step before sending the image data to the external equipment.

Therefore, in the case where the multi-functional peripheral 1 serves as a facsimile machine or a scanner (in the case where the scanner function or the facsimile function is set through the function selection button 58), it is preferable that the mode setting section 611 is forcibly switched to the image quality priority mode so as not to execute the foreign object image removing processing even in the case where the productivity priority mode is set by the mode selecting section 59.

[3] In the first embodiment, the CCD 229 (scanner section 22) and the CIS 231 are provided as reading section for reading the image of the document. However, another CCD may be adopted in place of the CIS 231, or another CIS may be adopted in place of the CCD 229 (scanner section 22). Further, the present invention includes the form of providing the CIS 231 at the position of the CCD 229 (scanner section 22) in the first embodiment and providing the CCD 229 (scanner section 22) at the position of the CIS 231 in the first embodiment.

[4] There is a case where a plurality of image processing modes, for example, a character mode and a picture mode are provided in the multi-functional peripheral 1 to execute optimal image processing in accordance with a kind of a document to be copied. In such case, these modes may be associated with the productivity priority mode or the image quality priority mode.

In other words, the picture mode is a mode adopted in the case of copying a picture and a diagram. In this mode, it is necessary to reproduce various density of the picture and diagram formed on the document, and a high image quality is likely to be requested. Therefore, the picture mode is associated with the image quality priority mode. On the other hand, the character mode is a mode which is adopted in the case of copying characters. In this mode, it is less likely that a high image quality be requested, and it is more likely that productivity is requested. Therefore, it is preferable that the character mode be associated with the productivity priority mode.

Further, the productivity priority mode or the image quality priority mode may be determined in accordance with a size of the document. In other words, for example, a document having so-called "A3" size belongs to a group of documents having a relatively large size, and for reading the image it takes a relatively long time. Therefore, even if the reading operation is performed in the image quality priority mode with respect to such document, there is no great difference in the reading time as compared to the case of performing the reading operation in the productivity priority mode. Therefore, for the document having a relatively large size like the document having so-called "A3" size, the image reading operation may be performed in the image quality priority mode.

On the other hand, a document having so-called "B5" size belongs to a group of documents having a relatively small size, and the time for reading the image is relatively short. Therefore, if the reading operation is performed in the image quality priority mode with respect to such document, there is a relatively great difference in the reading time as compared to the case of performing the reading operation in the productivity priority mode. Therefore, for the document having a relatively small size like the document having so-called "B5" size, the image reading operation may be performed in the productivity priority mode.

[5] Before conveying the document (for example, at the position indicated by "C0" in FIG. 4), the conveyance controller 617 may start the conveying operation of conveying the document after confirming that the foreign object is not present.

[6] In the above embodiment, the portion where the foreign object adheres is limited to the glass 221. However, the foreign object may adhere also to the platen 213. In the case where it is detected that the foreign object is present in accordance with the image obtained by the reading operation performed when the clearance between the documents (for example, the positions "C0" and "C1" shown in FIG. 4) passes through the reading position, it may be determined that the foreign object adheres to the portion of the glass 221 or the portion of the platen 213 corresponding to the reading position P.

Further, in this case, in accordance with whether it is detected that the foreign object is present based on the image obtained by the reading operation performed during the period of time when the document passes through the reading position P, it may be determined whether the foreign object adheres to the glass 221 or to the platen 213.

In other words, when the document passes through the reading position P, the platen 213 is hidden when viewed from the side of the scanner section 22. Therefore, platen 213 is not taken by the scanner section 22. Thus, in FIG. 4, for example, in the case where the foreign object is detected based on the images obtained at the positions A1, B1, it can be determined that the foreign object adheres to the glass 221. On the other hand, for example, in the case where the foreign object is not detected based on images obtained at the positions A1, B1, it can be determined that the foreign object adheres to the platen 213.

[7] In the first embodiment, in the case where the foreign object image is detected by the foreign object image detector 613, a position in the reading slit 230 at which the foreign object is not present is detected, and this position is derived as a reading position of the scanner section 22. A plurality of reading positions may be prepared in advance, and the controller 61 may select a reading position of the scanner section 22 from these reading positions at each time when the foreign object is detected.

Figure 9:
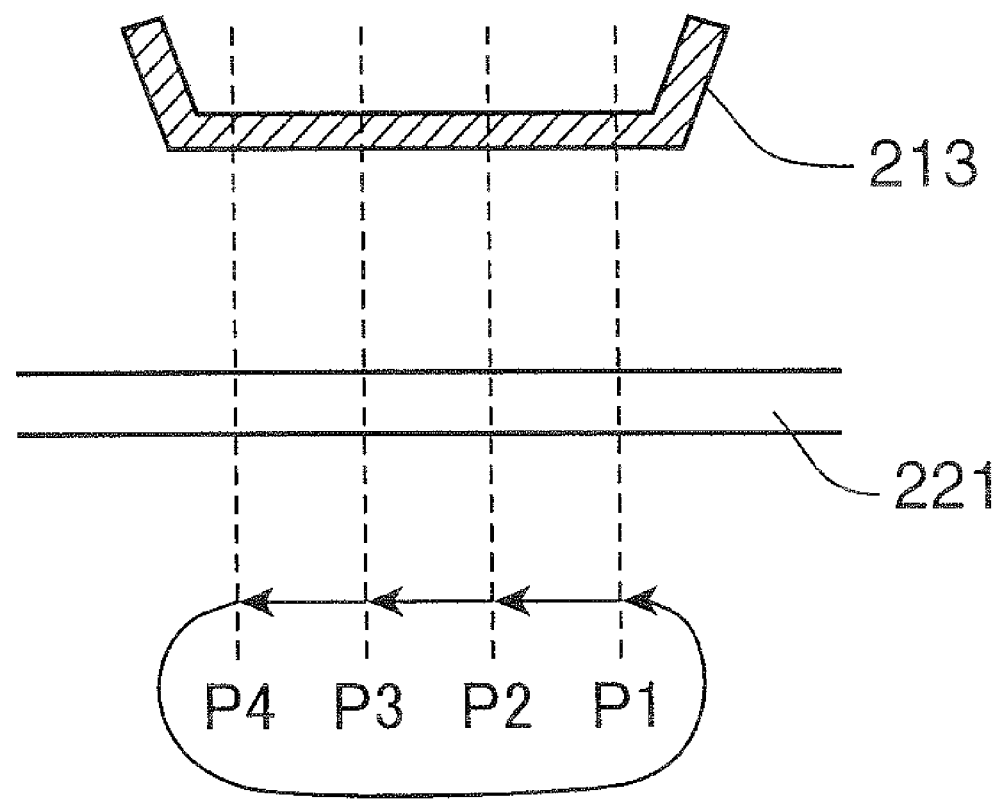
FIG. 9 shows a state where a plurality of reading positions of the scanner section are provided in advance.

FIG. 9 shows a state where a plurality of different reading positions P1-P4 are prepared in the sub-scanning direction in advance, and the reading positions of the scanner section 22 are cyclically switched in the order of P1, P2, P3 (example of a third reading position in the claims), P4, P1, for example, at each time the foreign object is detected.

[8] In the first embodiment, in the case where the image quality priority mode is set by the mode setting section 611, and the foreign object image is detected by the foreign object image detector 613, the conveyance controller 617 stops conveyance of the document for a predetermined time period. However, it is preferable that the following points should be considered as to the stopped position.

Figure 10A:
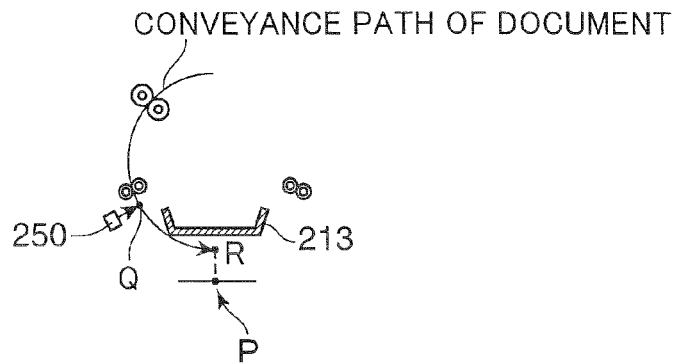
FIG. 10 shows a situation where stopping of conveyance of a document is delayed.
Figure 10B:
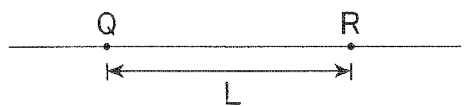
Figure 10C:
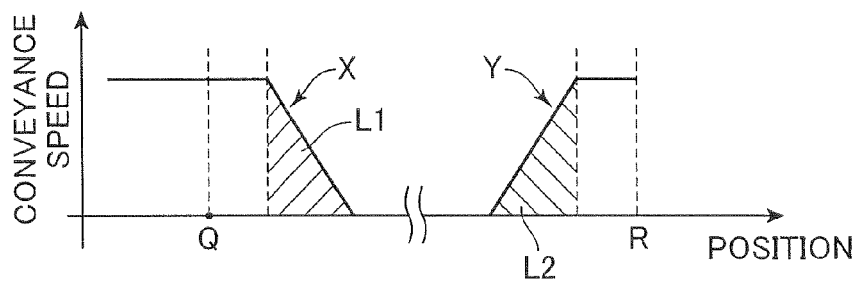

FIG. 10A is an enlarged view of the periphery of the platen 213. FIG. 10B shows a conveying path of the document in periphery of the platen 213, depicted virtually in a straight line, and also shows a distance L in the conveying path of the document from a position Q, at which the document is detected by the timing sensor 250, to a reading position R of the scanner section 22. FIG. 10C is a graph showing a conveyance speed of the document in the case where the conveyance of the document is stopped and then restarted.

In the case of stopping conveyance of the document, when the conveyance controller 617 outputs a drive stopping signal to a motor related to conveyance of a document, the conveyance speed of the document does not become zero immediately. As indicated by the arrow X in FIG. 10C, an inertia force causes a time to make the conveyance speed of the document be zero, so that a free running distance L1 occurs. Further, in the case of restarting the conveyance of document, even if the conveyance controller 617 outputs a drive restart signal to the motor related to the conveyance of document, the conveyance speed of the document does not reach a required speed immediately. As indicated by the arrow Y in FIG. 10C, it takes a time before the conveyance speed of the document reaches the required speed, so that a running-up distance L2 is required. In FIG. 10C, changes in the conveyance speed is depicted by assuming that conveyance speed of the document in the free-running period and the running-up period is reduced or increased at a constant rate. The absolute value of acceleration in the free-running period and the running-up period may be equal or different.

Figure 10D:
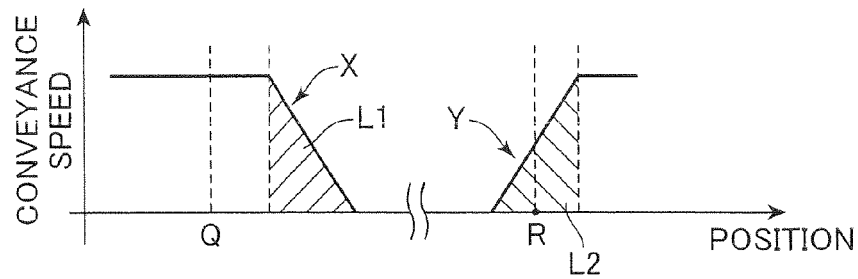

Thus, it is necessary to start a control of stopping conveyance of the document at a position before the reading position R by a distance equal to or longer than a sum of the free running distance L1 and the running-up distance L2 (L1+L2). If it is not so set, as shown in FIG. 10D, the document passes through the reading position of the scanner section 22 in the course of raising the conveyance speed of the document. In this case, after the conveyance of the document is restarted, the document cannot pass through the reading position of the scanner section 22 at a suitable speed, so that the reading operation of the scanner section 22 and the conveying operation of conveying the document in the sub-scanning direction cannot be synchronized.

Therefore, when it is necessary to stop the conveyance of the document, the conveyance controller 617 of the present embodiment starts a control for stopping the conveyance of the document at a position before the reading position R by the distance of a sum of the free running distance L1 and the running-up distance L2 (L1+L2). The timing at which the document reaches a position before the reading position R by the distance equal to or greater than the distance (L1+L2) may be detected based on the detection signal from the timing sensor 250. In other words, while the detection position by the timing sensor 250 is the position before the reading position R by the distance equal to or greater than the distance (L1+L2), the control for stopping the conveyance of the document may be started if the timing sensor 250 detects that the document arrives at the position. However, taking in consideration that there is a predetermined time lag between the detection timing of the timing sensor 250 and the timing for starting control of stopping conveyance of the document, the detection position of the timing sensor 250 should be set at a position on an upstream side from the aforementioned position by a predetermined distance, and the control of stopping the conveyance of the document should be started if it is detected that the timing sensor 250 detects reaching of the document to the detection position is detected.

Further, it is preferable that the determination as to whether it is necessary to stop conveyance of the document should be performed in accordance with whether a reading approval signal (a signal which approves the reading operation with respect to the document when the foreign object image is not detected in the image obtained by the reading operation with respect to the clearance) is outputted from the foreign object image detector 613 to the conveyance controller 617 and the reading controller 612 before the document reaches the position at which the control of stopping the conveyance of the document should be started. In other words, if the reading approval signal is outputted from the foreign object image detector 613 to the conveyance controller 617 and the reading controller 612 before the document reaches the position at which the control of stopping the conveyance of the document should be started, the conveyance controller 617 determines that it is not necessary to stop the conveyance of the document. On the other hand, if the reading approval signal is not outputted from the foreign object image detector 613 to the conveyance controller 617 and the reading controller 612 before the document reaches the position at which the control of stopping conveyance of the document should be started, the conveyance controller 617 determines that it is necessary to stop the conveyance of the document.

Figure 11:
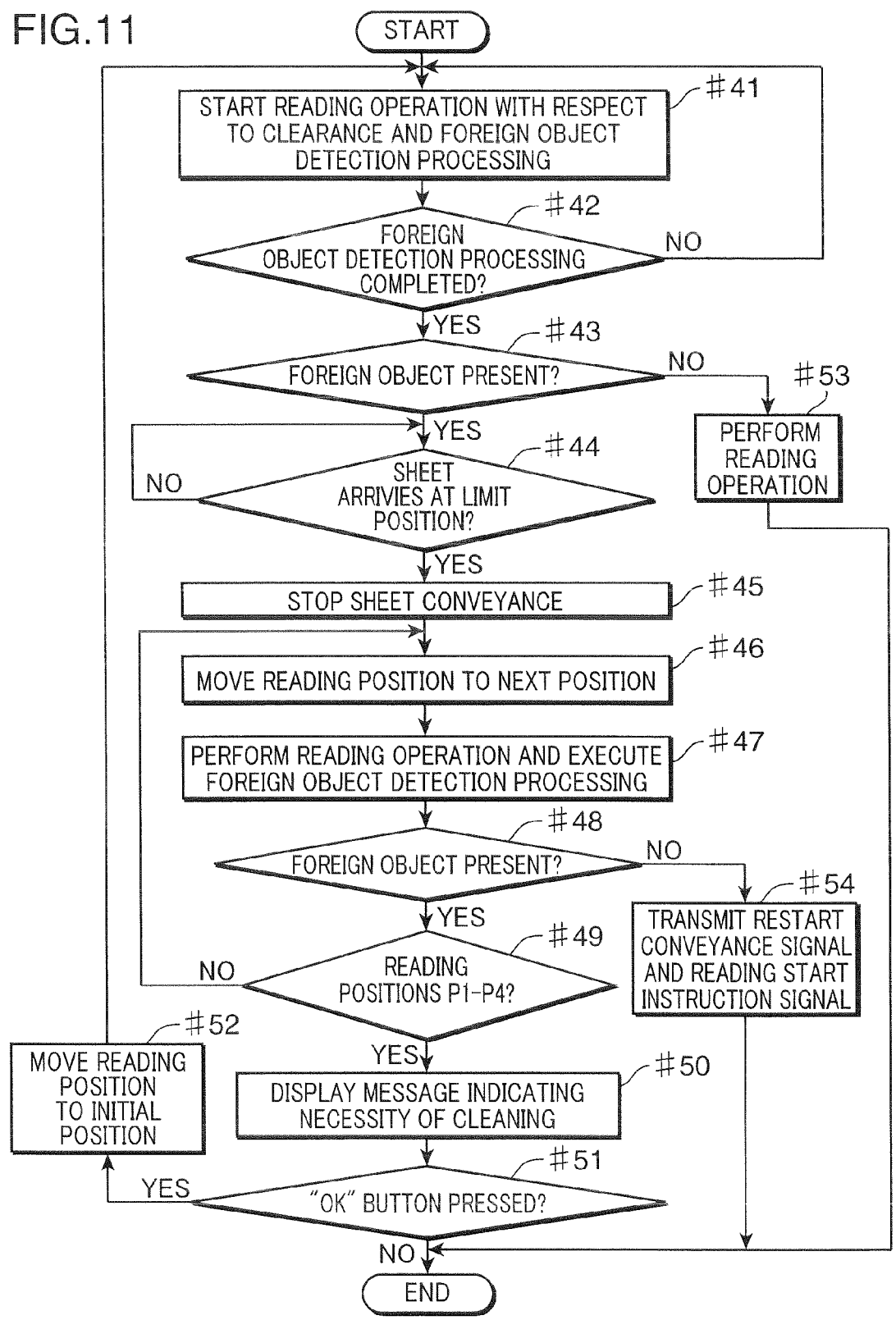
FIG. 11 is a flowchart showing a modified example of a processing executed by the controller.

FIG. 11 is a flowchart showing the processing of the controller 61 in the image quality priority mode of the present embodiment. The position at which the control of stopping conveyance of the document should be started is named as a limit position. Further, like the modified embodiment [7], a plurality of different reading positions P1-P4 are prepared in the sub-scanning direction. For example, at each time when the foreign object is detected, the reading positions of the scanner section 22 are switched cyclically in the order of P1, P2, P3, P4, P1 . . . and so on.

As shown in FIG. 11, the reading controller 612 controls the scanner section 22 to perform the reading operation with respect to the clearance, and the foreign object image detector 613 starts the detection operation of the foreign object image in accordance with the image obtained by the reading operation with respect to the clearance (step #41).

If the foreign object detection processing executed by the foreign object image detector 613 is not completed (NO in step #42), the routine goes back to the processing of step #41. If the foreign object detection operation is completed (YES in step #42), the routine proceeds to the processing of next step #43 and so on.

As a result of the foreign object detection processing, if the foreign object image is not detected (NO in step #43), the foreign object image detector 613 outputs a signal of approving the reading operation and the reading controller 612, so that the document reading operation is performed (step #53).

On the other hand, if the foreign object image is detected (YES in step #43), the conveyance controller 617 stops the conveyance operation of the document at the time when the document reaches the limit position (YES in step #44, #45).

Then, the drive controller 616 moves the first and second carriages 226, 227 in the sub-scanning direction so that the reading position of the scanner section 22 moves to the reading position of the next order (step #46). Thereafter, the reading controller 612 controls the scanner section 22 to perform the reading operation in this state, and executes the detection processing for detecting the foreign object image in accordance with the image obtained by the reading operation (step #47).

As a result of the foreign object detection processing, if the foreign object image is not detected (NO in step #48), the foreign object image detector 613 outputs the signal of approving restart of conveyance to the conveyance controller 617 and the reading operation to the reading controller 612 (step #54).

Accordingly, when the conveying operation of the document and the reading operation by the scanner section 22 are restarted, the document can pass through the reading position of the scanner section 22 at a suitable speed.

On the other hand, if the foreign object image is detected (YES in step #48), the controller 61 determines whether the reading position of the scanner section 22 is cycled within the reading positions P1-P4 (step #49).

If the reading position is not cycled (NO in step #49), the routine goes back to the processing of step #46. If the foreign object image detector 613 determines that the reading position is cycled (YES in step #49), the controller 61 controls the display section 51 to display a message indicating that it is necessary to wipe the glass 221 located at a position of facing the reading position P (step #50). At this time, the controller 61 controls the display section 51 to display the "OK" button together with the message.

After the displaying operation, if the controller 61 receives a signal indicating that the "OK" button is pressed by a user through the touch panel function (YES in step #51), the drive controller 616 controls the first and second carriages 226, 227 to a predetermined initial position (for example, the reading position P1) (step #52). After that the routine goes back to the step #41.

Further, if the controller 61 does not receive a signal indicating that the "OK" button is not pressed by a user after elapse of a predetermined time from the displaying operation (NO in step #51), the processing is terminated.

According to an aspect of the present invention, there is provided an image data creating mode selecting section which allows a user to select a mode from a first image data creating mode and a second image data creating mode. In the first image data creating mode, if it is determined that the foreign object is present, the first reading section performs the reading position at the first reading position, and the foreign object image removing processing is executed with respect to the image data obtained by the reading operation to obtain image data. In the second image data creating mode, if the first determining section determines that the foreign object is present, the first reading section performs the reading operation at the second reading position, and the foreign object image removing processing is executed with respect to the image data obtained by the reading operation to obtain image data. Since the setting for performing the reading operation and the image data creating operation in the mode selected by the mode setting section is made, a user can use the image data creating mode selecting section to select a desired mode from the first image data creating mode and the second image data creating mode.

In other words, for the purpose of suppressing occurrence of a linear image caused by dirt and the like present in the image reading apparatus, a user can select a desired technology from among a plurality of technologies for suppressing occurrence of the linear image in accordance with which of image quality and productivity a user prioritizes.

In the case where there is provided the second reading section which reads an image on the other side of the document at the third position different from the first and second reading positions, there is possibility that the foreign object adheres at the third reading position. However, if there is provided the second reading section like the present invention, the second reading section performs the reading operation during a period when the clearance passes through the third reading position, and presence or absence of the foreign object at the third reading position is determined based on image data obtained by the reading operation. If it is determined that the foreign object is present, the conveyance operation is performed by the conveying section in such a manner that the image on one side of the document is read, and the document is reversed, and the image on the other side of the document is read by the first reading section. Accordingly, also as to the image on the other side of the document, it can avoid forming of the foreign object image on the recording sheet.

If the second determination section determines that the foreign object is not present, the conveying section performs the conveyance operation in such a manner that the reversing operation of the document is stopped, and the image on one side of the document is read by the first reading section and the image on the other side of the document is read by the second reading section. Accordingly, it can suppress the reduction in the number of documents to be read in a unit of time due to the time loss caused by continuously performing the reversing operation.

When the conveying operation and the reading operation with respect to the document are restarted, the document can pass through the first reading position for of the first reading section at a suitable speed.

The document conveyance by the document conveying section is not stopped if the foreign object detection processing by the foreign object detector is terminated quickly. Therefore, lowering in productivity of the document reading can be suppressed.

Generally in image reading apparatuses, in the case of performing the processing of sending image data to an external equipment, there is a case where it is difficult for the image reading apparatus to execute the foreign object image removing processing in the step before sending the image data to the external equipment in relation to the order of the image processing to be executed. According to the aspect of the present invention, when the transmission mode for sending the image data to the external equipment is set, even if the first image data creating mode is selected, the mode is forcibly changed to the second image data creating mode to avoid forming of the foreign object image on the recording sheet, so that foreign object image removing processing becomes unnecessary.

The effect which is the same as the invention of the aforementioned image reading apparatus can be achieved in the image forming apparatus.

This application is based on Japanese Patent application serial No. 2008-177480 filed in Japan Patent Office on Jul. 8, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
a document conveying section which sequentially conveys a plurality of documents while providing clearances between the documents in a document conveying direction;
a first reading section which performs a reading operation at a predetermined first reading position in a main scanning direction with respect to a document which passes through the first reading position in a sub-scanning direction;
a first reading controller which controls the first reading section to perform a reading operation for reading an image of the clearance when the clearance passes through the first reading position;
a first determining section which determines presence or absence of a foreign object at the first reading position in accordance with image data obtained by the reading operation based on an instruction from the first reading controller;
a second reading controller which controls the first reading section to perform a reading operation for reading a document image when the document passes through the first reading position;
a foreign object image removing processor which removes a foreign object image, which is caused by a foreign object adhered at the first reading position, from an image obtained by the reading operation based on an instruction from the second reading controller;

a changing section changes the reading position of the first reading section to a second reading position which is different from the first reading position;

an image data creating mode selecting section which receives an instruction of selecting a mode from among a first image data creating mode and a second image data creating mode, the first image data creating mode being adapted for obtaining image data by allowing the first reading section to perform the reading operation at the first reading position and allowing the foreign object image removing processor to execute the foreign object image removing processing with respect to the image data obtained by the reading operation if the first determining section determines that the foreign object is present, the second image data creating mode being adapted for obtaining image data by allowing the first reading section to perform the reading operation at the second reading position without allowing the foreign object image removing processor to execute the foreign object image removing processing with respect to the image data obtained by the reading operation if the first determining section determines that the foreign object is present; and a mode setting section which performs setting of the reading operation and the image creating operation in any one of the selected modes with respect to each section necessary for executing the first image data creating mode or the second image data creating mode selected in accordance with the instruction received by the image data creating mode selecting section.

2. The image reading apparatus according to claim 1, wherein the first reading section reads an image of one side of the document, and the image reading apparatus further comprises:

a second reading section which reads an image on the other side of the document at a third reading position which is different from the first and second reading positions;

a third reading controller which controls the second reading section to perform the reading operation for reading an image of the clearance when the clearance passes through the third reading position;

a conveying section which performs a conveying operation for conveying a document through a conveying passage passing through the first through third reading positions, has a reversing section on the conveying passage and, the reversing section reverses the document to allow the other side of the document to be read after the first reading section terminates reading the one side of the document;

a second determination section which determines presence or absence of a foreign object at the third reading position in accordance with image data obtained by the reading operation based on an instruction from the third reading controller; and a conveyance controller which controls the conveying section to perform a conveying operation, if the second determination section determines that the foreign object is present, so as to perform the document reversing operation after the image on one side of the document is read by the first reading section, so that the image on the other side of the document is to be read by the first reading section.

3. The image reading apparatus according to claim 2, wherein if the second determination section determines that no foreign object is present, the conveyance controller controls the document reversing operation to be aborted and controls the conveying section to perform the conveying operation such that the image on one side of the document is to be read by the first reading section and then the image on the other side of the document is to be read by the second reading section.

4. The image reading apparatus according to claim 2, wherein the first reading section is configured by using a reduction optical system image sensor; and the second reading section is configured by using a contact type optical system image sensor.

5. The image reading apparatus according to claim 3, wherein the first reading section is configured by using a reduction optical system image sensor; and the second reading section is configured by using a contact type optical system image sensor.

6. An image forming apparatus, comprising:

the image reading apparatus according to claim 1; and an image forming section which forms an image on a recording medium in accordance with image data outputted from the image reading apparatus.

* * * * *